(12) United States Patent
Lea

(10) Patent No.: US 12,135,962 B2
(45) Date of Patent: Nov. 5, 2024

(54) SYSTEM AND METHOD FOR TRACKING STATUS OF END-USER DEVICES UNDER TR-069 PROTOCOL

(71) Applicant: Rakuten Mobile, Inc., Tokyo (JP)

(72) Inventor: Richard Lea, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 18/042,300

(22) PCT Filed: Nov. 29, 2022

(86) PCT No.: PCT/US2022/051284
§ 371 (c)(1),
(2) Date: Feb. 21, 2023

(87) PCT Pub. No.: WO2024/118061
PCT Pub. Date: Jun. 6, 2024

(65) Prior Publication Data
US 2024/0264816 A1    Aug. 8, 2024

(51) Int. Cl.
*H04L 67/01* (2022.01)
*G06F 8/65* (2018.01)
*H04L 41/082* (2022.01)
*H04L 67/00* (2022.01)
*H04L 69/321* (2022.01)

(52) U.S. Cl.
CPC .............. *G06F 8/65* (2013.01); *H04L 41/082* (2013.01); *H04L 67/34* (2013.01)

(58) Field of Classification Search
CPC ......... G06F 8/65; H04L 41/082; H04L 67/34; H04L 67/16; H04L 67/01; H04L 69/321; H04L 4/50; H04W 4/70
USPC .......................................................... 709/221
See application file for complete search history.

(56) References Cited

U.S. PATENT DOCUMENTS

| 8,843,622 B1* | 9/2014 | Graham .................. H04L 67/54 709/224 |
| 2021/0083926 A1* | 3/2021 | Costa .................. H04L 41/0686 |
| 2022/0103656 A1* | 3/2022 | Saarnivala ............ H04L 69/321 |

* cited by examiner

*Primary Examiner* — Jude Jean Gilles
(74) *Attorney, Agent, or Firm* — HAUPTMAN HAM, LLP

(57) ABSTRACT

A method includes receiving, by a configuration server via a TR-069 protocol, a request from a customer premises equipment to update a firmware of the customer premises equipment, the TR-069 protocol including an application layer to trigger logging of a status of an update of the firmware for the customer premises equipment; creating, by the configuration server, a log file for the customer premises equipment in response to the request from the customer premises equipment to update the firmware of the customer premises equipment; and logging, by the configuration server via the TR-069 protocol, within the log file the status of the update of the firmware for the customer premises equipment.

20 Claims, 14 Drawing Sheets

| Parameter | Description |
|---|---|
| Device.DeviceInfo.DeviceCategory (Optional.) | Comma-Separated List of Strings. Each List item is a Device Category (e.g. "Router", "Recorder" and "Tracker"). |
| Device.DeviceInfo.ProductClass (Required.) | Identifier of the Class of Product for which the Serial Number Applies. The Product Class Identifier is Used in Inform Calls from CPE, Including Across Firmware Updates. Any Change Indicates that the Device is a New Device and a BOOTSTRAP Inform is to be Performed. BOOTSTRAP Inform is Sent by CPE to ACS to Inform the ACS of the Identify, and Communication Information for the ACS to Communicate with the CPE. |
| Device.DeviceInfo.Manufacturer (Required.) | The Manufacturer of the CPE. This Parameter is Used in Inform Calls from the CPE to Share Manufacturer Information with the ACS. |
| Device.DeviceInfo.ManufacturerOUI (Required.) | Organizationally Unique Identifier of the Device Manufaturer. Represented as a Six Hexademical-Digit Value Using all Upper-Case Letters and Including any Leading Zeros. The OUI Value is Used in Inform Calls and Remains Fixed Over the Lifetime of the Device, Including Across Firmware Updates. Any Change Indicates that the Device is a New Device and a BOOTSTRAP Inform is to be Performed. |
| Device.DeviceInfo.SerialNumber (Required.) | Identifier of the Particular Device that is Unique for the Indicated Class of Product and Manufacturer. this Value would be Used in Each Inform Call from CPE. This Value MUST Remain Fixed Over the Lifetime of the Device, Including Across Firmware Updates. Any Change would Indicate that it is a New Device and would therefore Require a BOOTSTRAP Inform. |
| Device.DeviceInfo.SoftwareVersion (Optional.) | A String Identifying the Version of the Overall CPE Firmware.International Mobile Equipment Identity (IMEI) Number, Represented as a 15 Digit String (digits 0-9). |

FIG. 3A

| | |
|---|---|
| Device.Cellular.Interface.{i}.IMEI (Required.) ~324 ~326 | Specifies whether or Not this Particular Firmware Image is being Used by the Device. A Device Attempts to Boot this Particular Firmware Image in Response to the Value being Set to True. The Value is Set to True in Response to a New Firmware Image being Installed. In Response to the Firmware Image being Active or being Referenced by the Bootfirmwareimage Parameter, the Value is Not to be Set to False. ~364 |
| Device.Cellular.Interface.{i}.USIM.IMSI (Optional.) | International Mobile Subscriber Identity Represented as a String with Either 14 or 15 Digits. ~366 ~328 |
| Device.Cellular.Interface.{i}.USIM.ICCID (Optional.) | Integrated Circuit Card Identifier Represented as a String of up to 20 Digits. ~368 |
| Device.Cellular.Interface.{i}.USIM.MSISDN (Optional.) ~330 | Mobile Subscriber Integrated Service Digital Network Number. ~370 |
| Device.DeviceInfo.FirmwareImage.{i}.Alias (Optional.) ~332 | A Non-Volatile Unique Key Used to Reference this Instance of the Firmware Image. Alias Provides a Mechanism for a Controller to Label this Instance for Future reference. The Value MUST NOT be Empty and the Value MUST Start with a Letter. In Response to the Value of Alias Not being Assigned by the Controller at Creation Time, an Agent Assigns a Value with an "CPE-" Prefix. The Value of Alias does not Change Once the Value has been Assigned. ~372 |

FIG. 3A
(Continued)

| Parameter (Continued) | Description (Continued) |
|---|---|
| Device.DeviceInfo.Firmware.Image.{i}.Name (Optional.) —335 | Firmware Image Name. This Value Should be Descriptive Text of the Image or Filename. —374 |
| Device.DeviceInfo.Firmware.Image.{i}.Version(Required.) —336 | A String Identifying the Version of the Firmware Image. In response to the Firmware Image Version being Active (i.e., the Device has Booted this Firmware Image), the Value of the DeviceInfo.SoftwareVersion Parameter is to be the Same as the Value Contained in this Parameter. —375 |
| Device.DeviceInfo.Firmware.Image.{i}.Available (Required.) —338 | Specifies whether or Not this Particular Firmware Image is being Used by the Device. A Device Attempts to Boot this Particular Firmware Image in Response to the Value being Set to True. The Value is Set to True in Response to a New Firmware Image being Installed. In Response to the Firmware Image being Active or being Referenced by the BootFirmwareImage Parameter, the Value is Not to be Set to False. —376 |
| Device.DeviceInfo.Firmware.Image.{i}.Status (Required.) | Defines the Following Status of a Firmware Image that can be Determined by an Agent. the Agent is Implemented in the Device and Manages Firmware Image Processing, Validation and Installation Towards Final Reboot. —378<br>• No Image Indicates that the Firmware Image Instance is Empty. No Image is Used for an Agent that Supports Multiple Firmware Images, but has an Image Installed. —379<br>• Downloading Indicates that the Firmware Image Instance is being Downloaded. —380<br>• Validating Indicates that the Firmware Image Instance has been Downloaded, and is in the Process of being Validated. —381<br>• Available Indicates that the Firmware Image Instance has been Downloaded, Validated, and Installed, and is Ready to be Activated. —382 |

SYSTEM AND METHOD FOR TRACKING STATUS OF END-USER DEVICES UNDER TR-069 PROTOCOL

RELATED APPLICATIONS

The present application is a National Phase of International Application No. PCT/US2022/051284, filed Nov. 29, 2022.

TECHNICAL FIELD

This description relates to logging a status of a Firmware Over-The-Air (FOTA) Service Platform supporting TR-069 protocol and serverless environments.

BACKGROUND

Device re-programming, such as upgrading firmware, has been performed manually. A consumer was responsible for updating mobile device firmware via a device-specific service facility or a computer download. These inconvenient methods often resulted in inconsistent firmware updates and other issues. For operators, manual re-programming of devices is time-consuming and cost-ineffective, and in some instances is cost-prohibitive or impossible. This resulted in the passage of months or years with updates being made to devices, and caused such devices to become obsolete and more vulnerable to malicious actors.

Firmware Over-The-Air (FOTA) is a Mobile Software Management (MSM) technology in which the operating firmware of a mobile device is wirelessly updated and updated by a manufacturer, without the use of physical access to a device. FOTA-capable phones download updates directly from a service provider, such as a manufacturer and/or carrier. The ability to refresh the operating system of mobile devices keeps mobile devices secure, to add new functionalities, and to address errors, flaws, or faults in mobile device software.

Numerous protocols support FOTA, including provisioning, performing diagnostics, upgrading firmware, and removing, installing, and activating software components. For example, Open Mobile Alliance (OMA) Device Management (DM) is a protocol for management of mobile devices. OMA DM includes a number of specifications including protocol, architecture, underlying network binding etc. In the some instances, by implementing OMA DM specifications, the DM Server is able to handle remote management of mobile devices that have a DM Client. At the application layer, OMA DM implements the Firmware Update Management Object (FUMO) and the DM Client. The DM Server performs remote management on devices including provisioning, performing diagnostics, upgrading firmware, and removing, installing, and activating software components. OMA DM is focused primarily on mobile phones or devices similar to mobile phones.

The CPE WAN (CWMP) Management Protocol, published by The Broadband Forum as TR-069, specifies a standard for a communication mechanism for the remote management of end-user devices. The standard defines a protocol for the secure automated configuration of a TR-069-capable device and incorporates other management functions into a common framework. The TR-069 protocol simplifies device management by specifying the use of an Auto Configuration Server (ACS) to perform remote, centralized management of customer premises equipment (CPE). However, TR-069 does not provide an application layer for managing Over-The-Air (OTA) firmware upgrades of mobile devices using the OMA DM protocol.

Previously, end device manufactures (e.g., smartphone) and/or carriers manage and control firmware updates. For example, a device manufacturer is able to maintain firmware on their own servers. Device manufacturers also design their own data-package used for device update. Presently, there is not a platform that is capable of implementing firmware updates for varied types of devices, including, but not limited to, mobile phones. Further, TR-069 native devices are enabled with FOTA service, where FOTA services are restricted within OMA-DM devices or vendor-specified devices. With TR-069, manufacturers and/or carriers are able to fully manage firmware updates. However, there is no support for tracking a status of the FOTA service.

SUMMARY

In some embodiments, a method includes receiving, by a configuration server via a TR-069 protocol, a request from a customer premises equipment to update a firmware of the customer premises equipment, the TR-069 protocol including an application layer to trigger logging of a status of an update of the firmware for the customer premises equipment; creating, by the configuration server, a log file for the customer premises equipment in response to the request from the customer premises equipment to update the firmware of the customer premises equipment; and logging, by the configuration server via the TR-069 protocol, within the log file the status of the update of the firmware for the customer premises equipment.

In some embodiments, an apparatus, includes a processor; and a memory having instructions stored thereon that, when executed by the processor, cause the processor to receive, by a configuration server via a TR-069 protocol, a request from a customer premises equipment to update a firmware of the customer premises equipment, the TR-069 protocol including an application layer to trigger logging of a status of an update of the firmware for the customer premises equipment; create, by the configuration server, a log file for the customer premises equipment in response to the request from the customer premises equipment to update the firmware of the customer premises equipment; and log, by the configuration server via the TR-069 protocol, within the log file the status of the update of the firmware for the customer premises equipment.

In some embodiments, a non-transitory computer readable medium having instructions stored thereon that, when executed by a processor, cause the processor to receive, by a configuration server via a TR-069 protocol, a request from a customer premises equipment to update a firmware of the customer premises equipment, the TR-069 protocol including an application layer to trigger logging of a status of an update of the firmware for the customer premises equipment; create, by the configuration server, a log file for the customer premises equipment in response to the request from the customer premises equipment to update the firmware of the customer premises equipment; and log, by the configuration server via the TR-069 protocol, within the log file the status of the update of the firmware for the customer premises equipment.

BRIEF DESCRIPTION OF THE DRAWINGS

Aspects of the present disclosure are understood from the following detailed description when read with the accompanying figures. In accordance with the standard practice in the industry, various features are not drawn to scale. In some embodiments, dimensions of the various features are arbitrarily increased or reduced for clarity of discussion.

FIGS. 3A-B show a data model according to at least one embodiment.

DETAILED DESCRIPTION

Figure 1:
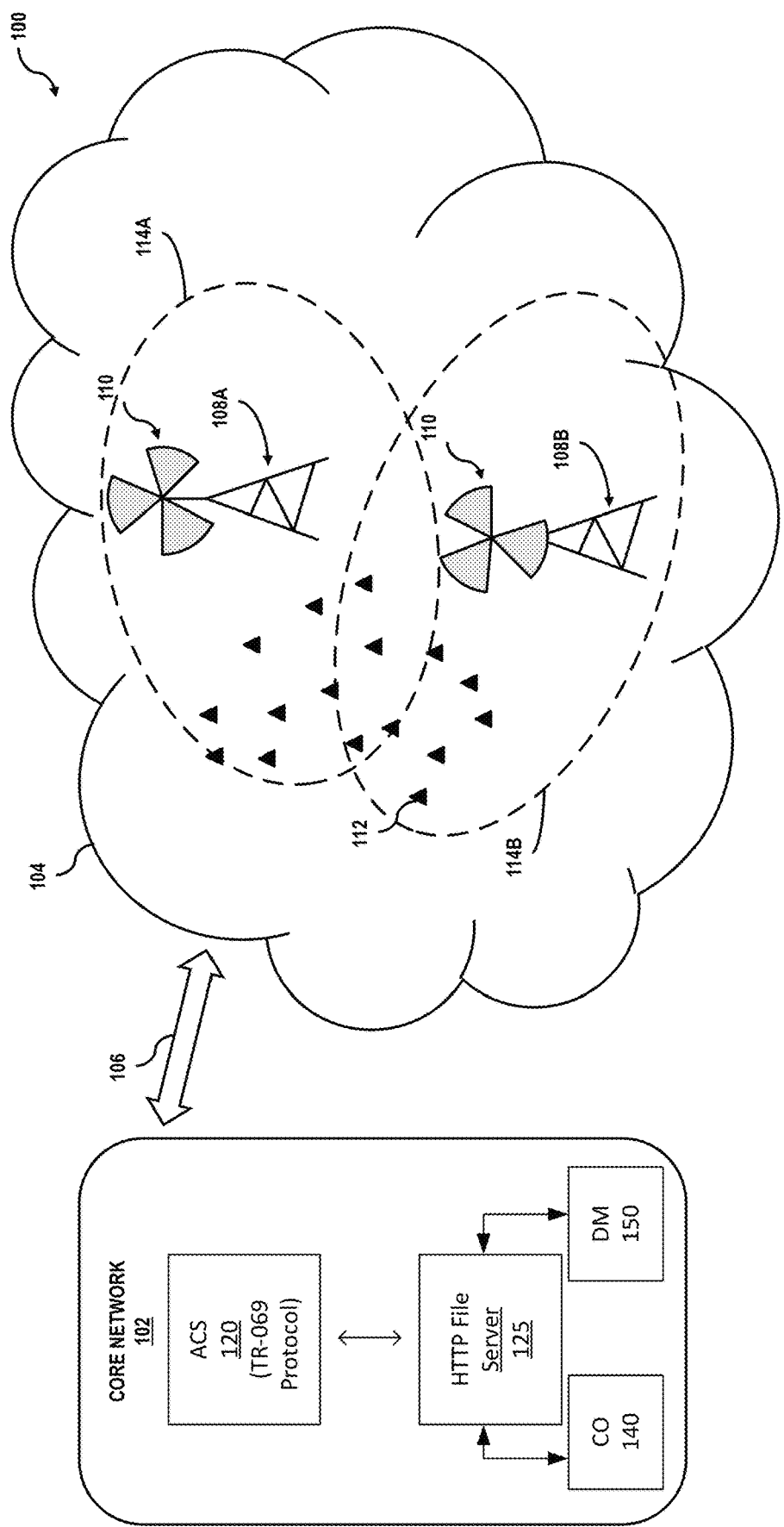
FIG. 1 is a diagrammatic representation of a FOTA status logging system for updating firmware and logging the status of firmware updates for each of a plurality of CPEs, according to some embodiments.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and ""at least one of A, B, or C" includes A, B, C, A and B, A and C, B and C, or A and B and C.

Terms like "customer premises equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming data-stream or signaling-stream. The foregoing terms are utilized interchangeably in the subject specification and related drawings. The terms "access point," "base station," "Node B," "evolved Node B (eNode B)," next generation Node B (gNB), enhanced gNB (engNB), home Node B (HNB)," "home access point (HAP)," or the like refer to a wireless network component or apparatus that serves and receives data, control, voice, video, sound, gaming data-stream or signaling-stream. from UE.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Some embodiments provide for logging a status of a FOTA service that provides a common depository for firmware from different manufactures and system operators and that allows users and firmware providers to download firmware to update devices of users, including, but not limited to, mobile phones. In some embodiments, a FOTA service/platform is provided for a variety of end devices and uses the TR-069 protocol to enable firmware updates. The TR-069 protocol was not originally intended for end devices to perform under LTE network (e.g., 4G and 5G). The platform enables end devices to receive firmware updates under WIFI environment and an LTE network. To provide this service with TR-069 gives rise to a concern that the basic application layer is missing. According to at least one embodiment, an application layer is added to a TR-069 firmware update protocol, thereby forming a TR-069 protocol. The TR-069 Firmware Update Protocol uses a FOTA interface that supports FOTA updates. In addition, the application layer allows for logging a status of the FOTA updates.

Advantages of logging a status of the FOTA updates include formulating metrics based on the logged status. In some embodiments, the metrics are used to diagnose why failures occurred during the FOTA updates.

FIG. 1 is a diagrammatic representation of a FOTA status logging system 100 for updating firmware and logging the status of firmware updates for each of a plurality of CPEs 112, according to some embodiments.

In FIG. 1, a Core Network 102 includes an Auto Configuration Server (ACS) 120 and an HTTP file server 125 in communication with the ACS 120. Firmware updates are released and stored in the HTTP file server 125. The Auto Configuration Server (ACS) 120 manages devices in or at the subscriber premises. ACS 120 is responsible for auto-configuration of CPEs 112 for advanced services. The CPEs 112 are a TR-069 protocol-enabled device, such as Mobile Phones Residential Gateways, Lan-side End Devices, and other Network Infrastructure Devices. TR-069 protocol specifies the communication between CPEs 112 and ACS 120. The ACS 120 acts as a remote management server for TR-069 protocol enabled CPE 130. ACS 120 enables automated remote provisioning and management tasks for TR-069 CPE devices 112, such as provisioning firmware updates obtained by ACS 120 from HTTP file server 125. The ACS 120 provisions a firmware update to the CPEs 112. In accordance with the embodiments disclosed herein, an application layer of the TR-069 protocol is provided to log a status of the FOTA services, as discussed in more detail below.

Coupled to the HTTP file server 125 are at least one of a carrier operator 140 or a device manufacturer 150. The carrier operator 140 and the device manufacturer 150 are two sources of firmware for the FOTA services disclosed herein. The carrier operator 140 provides the HTTP file server 125 with a carrier operator version of a firmware update and the device manufacturer 150 provides the HTTP file server 125 with a device manufacturer 150 version of a firmware update. Thus, the HTTP file server 125 is a single source of firmware updates for the CPEs 112.

The FOTA status logging system 100 further includes the CN 102 communicatively connected to RAN 104 through transport network (TN) 106, which is communicatively connected to base stations 108A and 108B (hereinafter base station 108), with antennas 110 that are wirelessly connected to CPEs 112 located in geographic coverage cells 114A and 114B (hereinafter geographic coverage cells 114). CN 102 includes one or more service provider(s) (not shown), third-party vendors (not shown), a configuration server, such as an auto configuration server (ACS) 120 in communication with the CPEs 112 and utilizing a version of the TR-069 protocol to log various parameters associated with firmware updates for the CPEs 112, respectively, and an HTTP file server 125 in communication with the CPEs 112. The ACS 120 logs parameters associated with FOTA updates for the CPEs 112, and in some embodiments at least one of formulate metrics based on the logged parameters associated with the FOTA updates or provides the logged parameters, stored by the log file, associated with the firmware updates to a third-party device (e.g., the carrier operator 140 and/or the device manufacturer 150) that formulates the metrics. These metrics are then used, in some embodiments, to diagnose failures associated with the FOTA updates.

Technical Report 069 (TR-069) is a technical specification of the broadband forum that defines an application layer protocol for remote management and provisioning of customer-premises equipment (CPE) connected to an Internet Protocol (IP) network. TR-069 uses the CPE WAN Management Protocol (CWMP) which provides support functions for auto-configuration, software or firmware image management, software module management, status and performance managements, and diagnostics.

The CWMP is a bidirectional simple object access protocol (SOAP)—and hypertext transfer protocol (HTTP)-based protocol and includes the communication between a CPE and auto configuration servers (ACS). The protocol addresses the growing number of different Internet access devices such as modems, routers, gateways, as well as end-user devices which connect to the Internet, such as set-top boxes, and VoIP-phones.

The OMA-DM protocol includes rules for tracking a status of end-user devices, specifically the OMA-Firmware Update Management Object (FUMO) application layer that includes rules for firmware logging. The OMA-DM protocol is a protocol designed for personal computers, tablets, etc. The TR-069 protocol lacks an application layer that would allow for firmware status logging. To overcome such a deficiency with the TR-069 protocol, the TR-069 protocol is, referenced herein as a TR-069 protocol that includes an application layer that allows for logging a status of a FOTA service, as discussed in more detail below.

The CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between CPES 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, TN 106 of FOTA status logging system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and CPES 112 begins with TN 106 connected to the CN 102. In some embodiments, TN 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations 108 are known by other names such as base transceiver station, mobile phone mast, or cell tower. In some embodiments, the base stations 108 are replaced with other edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In some embodiments, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, the CPEs 112 are a computer or computing system. Additionally, or alternatively, CPEs 112 have a liquid crystal display (LCD), light-emitting diode (LED) or organic light-emitting diode (OLED) screen interface, such as user interface (UI) 622 (FIG. 6), providing a touchscreen interface with digital buttons and keyboard or physical buttons along with a physical keyboard. In some embodiments, CPES 112 connects to the Internet and interconnects with other devices. Additionally, or alternatively, the CPES 112 incorporate integrated cameras, the ability to place and receive voice and video telephone calls, video games, and Global Positioning System (GPS) capabilities. Additionally, or alternatively, the CPEs 112 run operating systems (OS) that allow third-party apps specialized for capabilities to be installed and run. In some embodiments, CPEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and CPEs 112 are configured to communicate. Coverage depends on several factors, such as orography (i.e., mountains) and buildings, technology, radio frequency and most importantly for two-way telecommunications the sensitivity and transmit efficiency of CPES 112. Some frequencies provide better regional coverage, while other frequencies penetrate better through obstacles, such as buildings in cities. The ability of a CPE 112 to connect to a base station 108 depends on the strength of the signal.

The carrier operator 140 are businesses, vendors, customers, or organizations that sell bandwidth or network access to subscribers (utilizing UEs) by providing direct Internet backbone access to Internet service providers and usually access to network access points (NAPs). carrier operators are sometimes referred to as backbone providers, Internet providers, or vendors. Carrier operators include telecommunications companies, data carriers, wireless communications providers, Internet service providers, and cable television operators offering high-speed Internet access.

The carrier operator 140 often use radio access network planning (RAN Planning) to propose site locations (e.g., base stations, edge devices, or any other communication device within the scope of embodiments herein), configurations, and settings of new network nodes (either a redistribution point or a communication endpoint) to be rolled out in a wireless network. The general objectives of radio network planning are obtaining sufficient coverage over target area, ensuring satisfactory service quality and low bit-error rates, providing the demanded network capacity with low service blocking, satisfactory user throughputs and low dropped call rates, implementing an economically efficient network infrastructure (i.e., minimum number of sites and transmitters required to satisfy coverage, quality and capacity requirements). These radio network planning objectives are fulfilled by proper selection of site locations and configuration of cell settings and parameters, including antenna models, antenna heights, azimuth, and tilt angles, and other suitable equipment and parameters within the scope of embodiments. Site selection and configuration is useful, as the number of cells to be deployed in urban areas is much higher than for previous wireless technologies.

Figure 2:
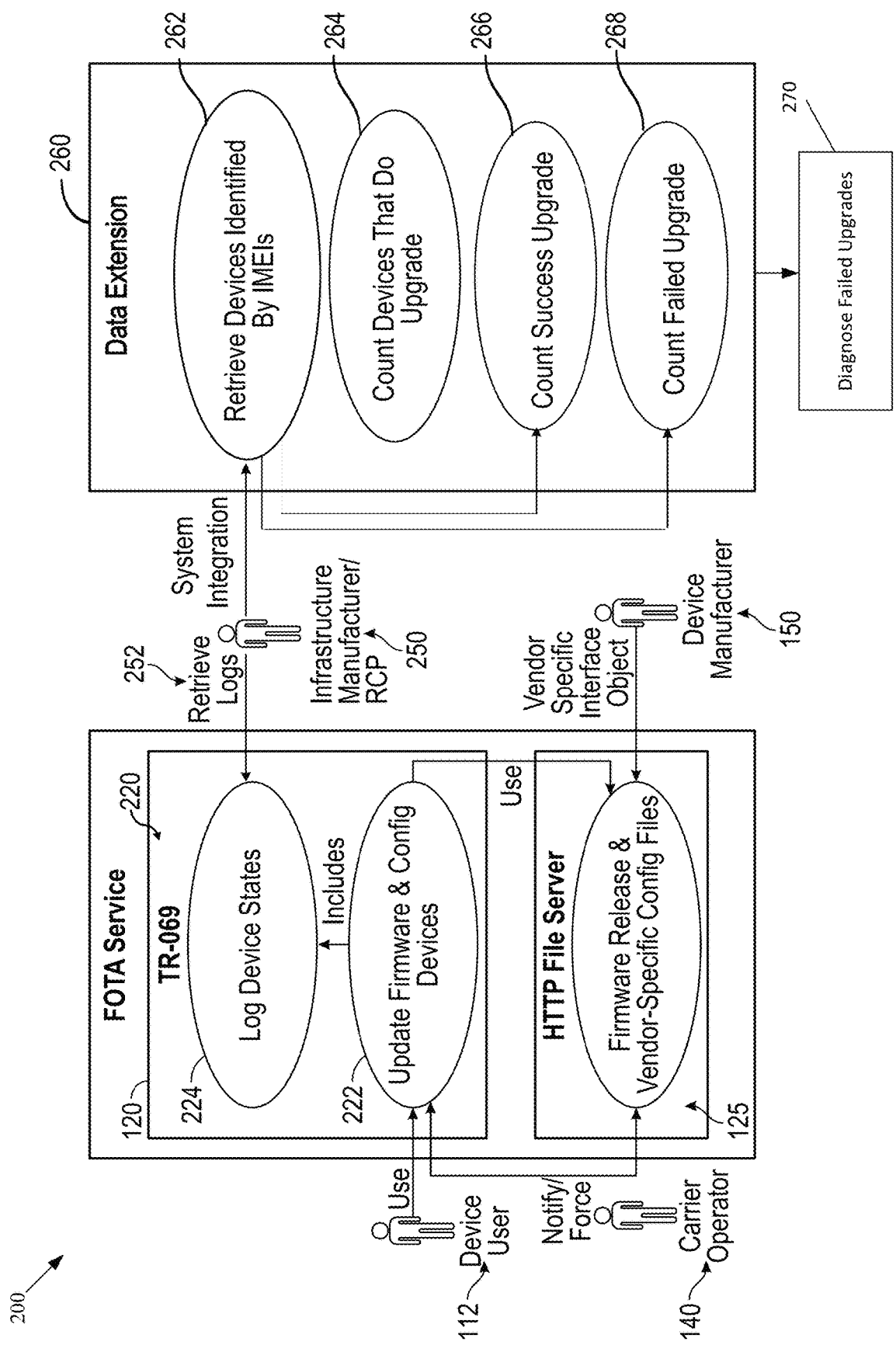
FIG. 2 is a block diagram of a FOTA services platform that uses a data model designed for providing FOTA services and logging a status of firmware updates based on TR-069 parameters, according to some embodiments.

FIG. 2 is a block diagram of a FOTA services platform 200 that uses a data model designed for providing FOTA services and logging a status of firmware updates based on TR-069 parameters, according to some embodiments. For example, a data model according to at least one embodiment is described with reference to FIGS. 3A-B.

The FOTA services platform 200 provides an interoperable firmware update solution for the CPEs 112. The FOTA services platform 200 provides an interface between CPEs 112 and a server to support this firmware update. The FOTA services platform 200 is able to be used under real business scenarios by manufacturers, operators and users. In FIG. 2, FOTA services platform 200 includes the HTTP file server 125 and a TR-069 FOTA Interface 220. In some embodiments, the ACS 120 includes the TR-069 FOTA Interface 220. The TR-069 FOTA Interface 220 is accessed by the CPEs 112 112 to initiate Update Firmware 222, via a user interface-initiated update, or by the Carrier Operator 140 to notify the CPEs 112 to initiate Update Firmware 222 or to force the device of CPEs 112 to Update Firmware 222. The Carrier Operator 140 is able to provide an Upload Firmware Release 212 to the HTTP file server 125.

The FOTA interface 220, via the TR-069 protocol, performs a Log Device States 224 process in which a status of the FOTA update is logged, such as within a log file. In some embodiments, the log file is stored by the ACS 120 within a FOTA status store, such as FOTA status store 475 described below with reference to FIG. 4. In some embodiments, an Infrastructure Manufacturer/RCP 250 retrieves FOTA status logs 252 from the ACS 120. The Infrastructure Manufacturer/RCP 250 integrates a Data Extension 260, including but not limited to a) counting IMEIs module 262, b) count Updates module 264, c) count Success Update module 266, d) count Failed Update module 268.

In some embodiments, the Data Extension 260 further tracks individual devices related to FOTA updates, such as a number of CPE 112 connected with ACS 120 for a given datetime period by counting a number of CPEs 112 identified by each CPE's 112 IMEI, a number of CPEs 112 connected with ACS 120 for a given datetime period and using a given Firmware Version, identified by each CPE's 112 IMEI, a distribution of different Firmware versions released across the CPEs 112 that connected with the ACS 120 for a given datetime period by identifying each CPE's 112 IMEI. In some embodiments, the Data Extension 260 determines a Recent Activation for a Given Firmware Version by the following equation:

[Numerator] The count of IMEIs for a given Firmware Version within a given datetime period—divided by—[Denominator] The count of IMEIs within a given datetime period.

The FOTA services platform 200 supports the download of update package(s), the subsequent installation of the update package(s) to update firmware, and the reporting of success or error results and associated status information. Carrier operators, service providers, infrastructure manufactures, device manufacturers (device vendors), and software vendors (mostly same with device manufacturers) use the FOTA services platform 200 to develop and deploy interoperable firmware update solutions.

The Carrier Operator 140 and/or the Device manufacturer 150 provide the details of the specified parameters used by the data model for providing FOTA services, these details being logged by the ACS 120 within a FOTA status store, such as FOTA status store 475 described below with reference to FIG. 4. For example, fields used by the FOTA services platform 200 for logging includes include values for Datetime, International Mobile Equipment Identity (IMEI) number ProductClass, SerialNumber, Organizationally Unique Identifier (OUI), Software Version, FirwareImage. Version, FirmwareImage.status, FaultCode, and VendorConfigFile. Version. As an example, the field "IMEI" in the log refers to the value from "Device.Cellular.Interface. {i}.IMEI" in TR-069 communications.

Datetime provides the date and time of the given record line. International Mobile Equipment Identity (IMEI) number is represented as a 15-digit string (digits 0-9). ProductClass is the identifier of the class of product for which the serial number applies, as defined in TR-181. This value is used in an Inform call from CPE, as defined in TR-069 DeviceIdStruct. The value of ProductClass remains fixed over the lifetime of the device, including across firmware updates. Any change indicates that it is a new device and a BOOTSTRAP Inform is to be performed.

SerialNumber is the identifier of the particular device that is unique for the indicated class of product and manufacturer. The value of SerialNumber is used in an Inform call from CPE. The value of SerialNumber remains fixed over the lifetime of the device, including across firmware updates. Any change indicate that the device is a new device and a BOOTSTRAP Inform is to be performed.

Organizationally Unique Identifier (OUI) of the device manufacturer is represented as a six hexadecimal-digit value using upper-case letters and including any leading zeros. As defined in TR-069, the OUI value is used in an Inform call and remains fixed over the lifetime of the device, including across firmware updates. Any change indicates that the device is a new device and a BOOTSTRAP Inform is to be performed.

Software Version is a string identifying the version of the overall CPE firmware as defined in TR-181. The FirmwareImage. Version is the target firmware version to update. The FirmwareImage.status is a target Firmware Version to update, the FaultCode is a single numeric fault code as specified in SOAP 1.1, with the values following TR-069 CPE fault code definitions, and the VendorConfigFile.Version is a version of a configuration file provided by the device manufacturer 150. The following Table lists example fault codes:

| Fault | Description | Type |
| --- | --- | --- |
| 9801 | User chose not to accept the operation when prompted | Client |
| 9802 | Battery was low when downloading Firmware Update Package | Client |
| 9803 | Download was not approved by the HTTP File Server | Client |
| 9804 | No WiFi connection when downloading Firmware Update Pkg | Client |
| 9805 | Download is paused by User | Client |
| 9806 | Reboot Failure due to Low Battery | Client |
| 9807 | Waiting Reboot due to not approved | Client |

Figure 4:
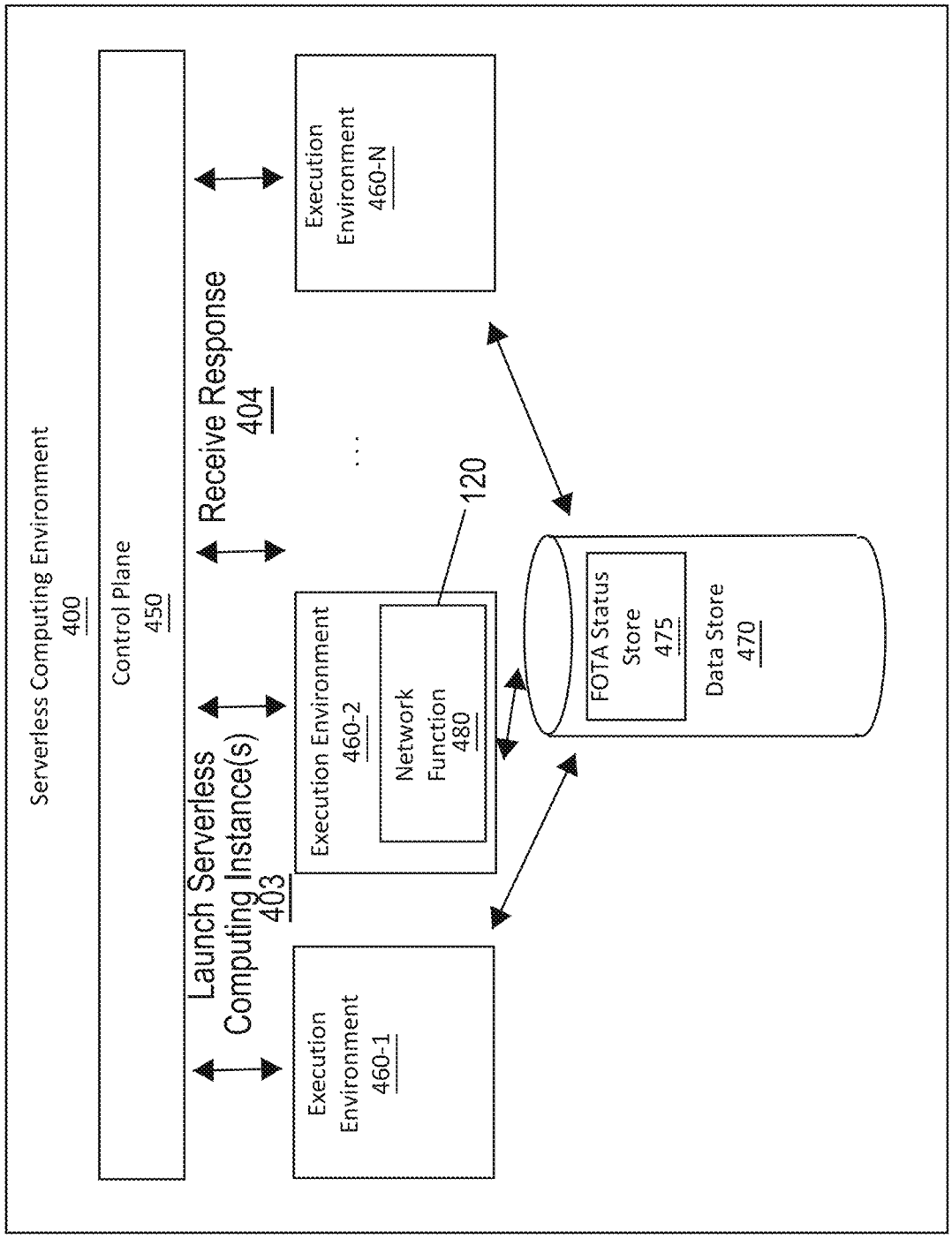
FIG. 4 is a block diagram of an example architecture for a serverless computing environment to implement Auto Configuration Server (ACS), in accordance with some embodiments.

The Infrastructure Manufacturer/RCP 250 further includes a Diagnose Failed Updates module 270 that analyzes logged status for the CPEs 112, such as that retrieved from a FOTA status store (see, FIG. 4). The Diagnose Failed Updates module 270 analyzes the IMEIs for which logged stats are available with module 262, analyzes a number of CPEs 112 that have performed FOTA update with module 264, analyzes a number of CPEs 112 that have performed a FOTA update with module 266, and analyzes a number of CPEs 112 that have failed to perform a FOTA update with module 268.

In some embodiments the Diagnose Failed Updates module 270 determines whether the number of CPEs 112 that failed to update has passed a threshold value for failed updates, prompting further action to determine a reason for the FOTA failures. The Diagnose Failed Updates module 270 obtains additional information from the CPEs 112 to determine a reason failed updates, such as at least one of apps installed on the CPEs 112 that may interfere with an update, an operating system the CPEs 112 are currently executing, a version of an operating system the CPEs 112 are currently executing, which network (WiFi vs. cellular) the update was attempted on, and any other specific information that is used to diagnose a failed FOTA update.

In some alternate embodiments, the ACS 120 includes the modules 262-270. The functions performed by these modules 262-270 are instead performed by the ACS 120. The ACS 120 then supplies the information produced by the modules 262-270 to any third-party device that requests such information, such as the carrier operator 140 and/or the device manufacturer 150.

In some embodiments, the Diagnose Failed Updates module 270 counts a number of CPEs 112 for which logged stats are available within a given period, such as in the last n days. In some embodiments, the Diagnose Failed Updates module 270 counts update package delivery rates for the CPEs 112 for which logged stats are available within a given period, such as in the last n days.

The Diagnose Failed Updates module 270 further diagnoses failed updates by determining a number of CPEs 112 connected with ACS 120 for a given datetime period and whether CPEs 112 have received a FirmwareImage exchange from ACS 120 but the CPEs 112 rejected the Update request, with this count of CPEs 112 being identified by each CPE's 112 IMEI. to determine a number of devices connected with ACS 120 for a given datetime period. The Diagnose Failed Updates module 270 diagnoses CPEs 112 that are with a "Status" value of DownloadFailed, this count being identified by each CPE's 112 IMEI. The Diagnose Failed Updates module 270 diagnoses a number of CPEs 112 connected with the ACS 120 for a given datetime period, these CPEs 112 with a "Status" valued of InstallationFailed or ValidationFailed, and a CPE Fault Code valued representing Low Battery, this count being identified by each CPE's 112 IMEI. The Diagnose Failed Updates module 270 diagnoses a number of CPEs 112 that did not receive an expected Firmware Update Exchange for a given datetime period, in some embodiments utilizing missing occurrences of an expected FirmwareImage, this count being identified by each CPE's 112 IMEI. This list is a non-limiting list of diagnosis and includes additional fault diagnosis in some other embodiments.

Figure 3B:
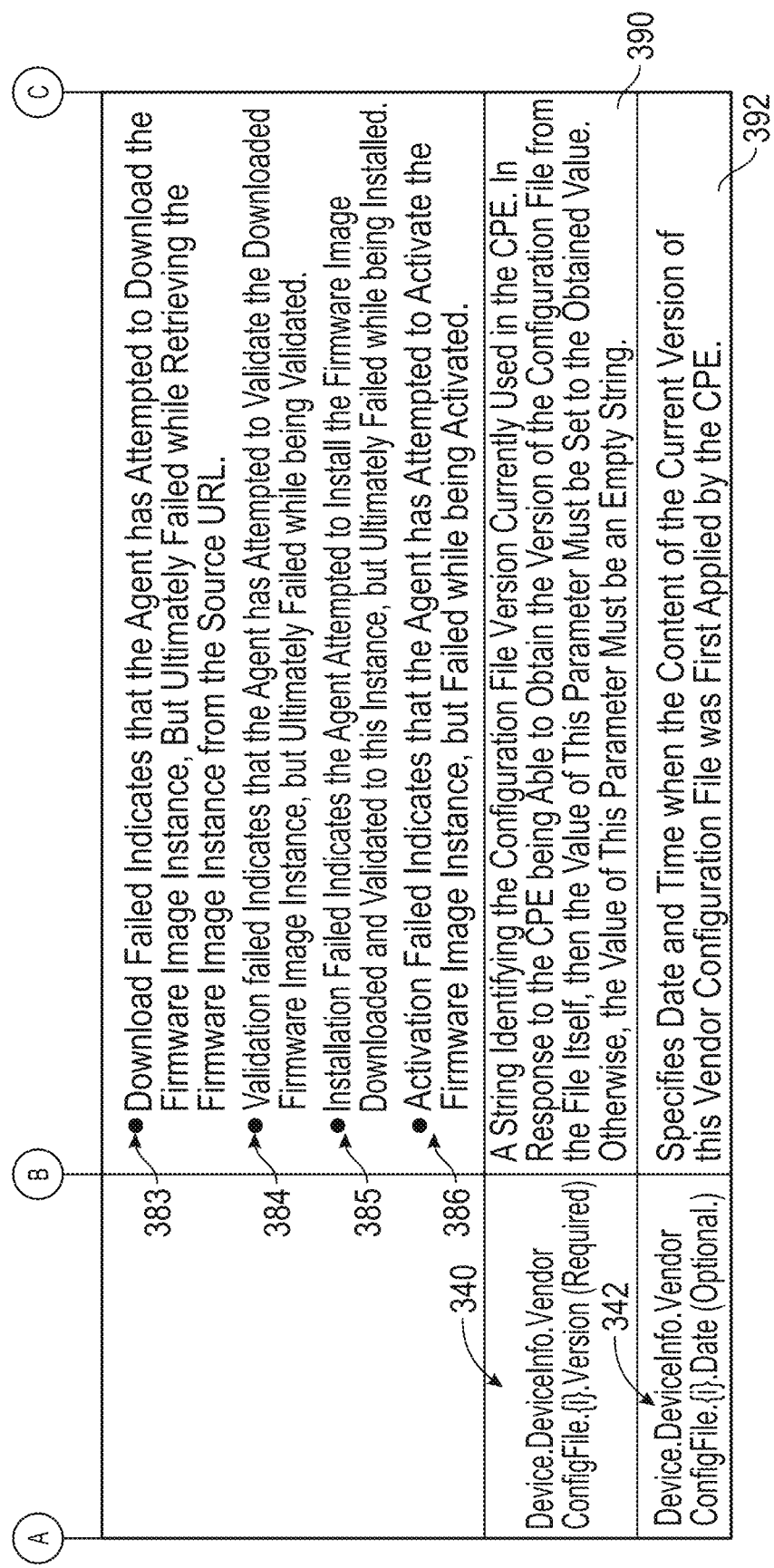

FIGS. 3A-B show a data model according to at least one embodiment.

The firmware update data model parameters are based on TR-181 Device:2 Data Model definitions as shown in Table 1. An instance of this Firmware Update Model includes the lifecycle of the Device:2 Data Model. Other fields are also able to be included.

TABLE 1

| Name | Type | Description |
| --- | --- | --- |
| Device.DeviceInfo | object | ProductClass, Manufacturer, OUI, SerialNumber |
| Device.Cellular.Interface.{i}. | object | A cellular modem including IMEI, and USIM |
| Device.DeviceInfo.FirmwareImage.{i}. | object | Top-level object for mapping firmware images, helping ACS capture the device firmware, push firmware update decision. |
| Device.DeviceInfo.VendorConfigFile.{i}. | object | Vendor |

TABLE 1-continued

| Name | Type | Description |
| --- | --- | --- |
| | | Configuration Files that CPE downloads from ACS. |

Firmware Update Data Model Overview

There may be one or more Firmware Image Interface Objects in one TR-069 session. Firmware images are mapped in the top-level object, Device.DeviceInfo.FirmwareImage. {i}. The following are the children Interface Objects of the Firmware Update Data Model based on TR-181.

The parameter Device.DeviceInfo.DeviceCategory (Optional) 312 has a description 352 of being a comma-separated list of strings. Each list item is a device category (e.g. "Router", "Recorder" and "Tracker").

The parameter Device.DeviceInfo.ProductClass 314 has a description 355 of being an identifier of the class of product for which the serial number applies. The product class identifier is used in Inform calls from CPE, and remains fixed over the lifetime of the device, including across firmware updates. Any change indicates that the device is a new device and a BOOTSTRAP Inform is to be performed. BOOTSTRAP inform is sent by CPE to ACS to inform the ACS of the identify, and communication information for the ACS to communicate with the CPE.

The parameter Device.DeviceInfo.Manufacturer 316 has a description 356 of being an identifier of the manufacturer of the CPE. This parameter is used in Inform calls from the CPE to share manufacturer information with the ACS.

The parameter Device.DeviceInfo.ManufacturerOUI 318 has a description 358 of being an Organizationally Unique Identifier (OUI) of the device manufacturer and is represented as a six hexadecimal-digit value using upper-case letters and including any leading zeros. The OUI value is used in Inform calls and remains fixed over the lifetime of the device, including across firmware updates. Any change indicates that the device is a new device and a BOOTSTRAP Inform is to be performed.

The parameter Device.DeviceInfo.SerialNumber 320 has a description 360 of being an identifier of the particular device that is unique for the indicated class of product and manufacturer. The serial number is used in Inform calls from the CPE. and remains fixed over the lifetime of the device, including across firmware updates. Any change indicates that the device is a new device and a BOOTSTRAP Inform is to be performed.

The parameter Device.DeviceInfo.SoftwareVersion (Optional) 322 has a description 362 of being a string that identifies the version of the overall CPE firmware.

The parameter Device.Cellular. Interface. {i}.IMEI 324 has a description 364 of being the International Mobile Equipment Identity (IMEI) number that is represented as a 15 digit string (digits 0-9).

The parameter: Device.Cellular. Interface. {i}.USIM.IMSI (Optional) 326 has a description 366 of being the Universal Subscriber Identity Module (USIM) International Mobile Subscriber Identity (IMSI) as represented as a string with either 14 or 15 digits.

The parameter Device.Cellular. Interface. {i}. USIM.ICCID (Optional) 328 has a description 368 of being the USIM Integrated Circuit Card Identifier (ICCID) that is represented as a string of up to 20 digits.

The parameter Device.Cellular. Interface.{i}.USIM.MSISDN (Optional) 330 has a description 370 of being the USIM Mobile Subscriber Integrated Service Digital Network (MSISDN) Number.

The parameter Device.DeviceInfo.FirmwareImage.{i}.Alias (Optional) 332 has a description 372 of being a non-volatile unique key used to reference the instance of the firmware image. Alias provides a mechanism for a controller to label this instance of the firmware image for future reference. Alias is not to be empty, and starts with a letter. In response to the value of Alias not being assigned by the controller at creation time, an agent assigns a value with an "CPE-" prefix. The value of Alias does not change once the value has been assigned.

FIG. 3B continues the description of the data model according to at least one embodiment.

The parameter Device.DeviceInfo.FirmwareImage.{i}.Name (Optional) 334 has a description 374 of being the firmware image name. This firmware image name is a descriptive text of the image or filename.

The parameter Device.DeviceInfo.FirmwareImage.{i}.Version 335 has a description 375 of being is a string that identifies the version of the firmware image. In response to the firmware image version being active (i.e., the device has booted this firmware image), the value of the DeviceInfo.Software Version parameter is to be the same as the value contained in this parameter.

The parameter Device.DeviceInfo.FirmwareImage.{i}.Available 336 has a description 376 of specifying whether or not this particular firmware image is being used by the device. A device attempts to boot this particular firmware image in response to the value being set to true. The value is set to true in response to a new firmware image being installed. In response to the firmware image being active or being referenced by the BootFirmwareImage parameter, the value is not to be set to false.

The parameter Device.DeviceInfo. FirmwareImage.{i}.Status 338 has a description 378 of defining the following status of a firmware image that can be determined by an agent. The agent is implemented in the device and manages firmware image processing, validation and installation towards final reboot. NoImage 379 indicates that the firmware image instance is empty. NoImage is used for an agent that supports multiple firmware images, but has an image installed. Downloading 380 indicates that the firmware image instance is being downloaded. Validating 381 indicates that the firmware image instance has been downloaded, and is in the process of being validated. Available 382 indicates that the firmware image instance has been downloaded, validated, and installed, and is ready to be activated. DownloadFailed 383 indicates that the agent has attempted to download the firmware image instance, but ultimately failed while retrieving the firmware image instance from the source URL. ValidationFailed 384 indicates that the agent has attempted to validate the downloaded firmware image instance, but ultimately failed while being validated. InstallationFailed 385 indicates the agent attempted to install the firmware image downloaded and validated to this instance, but ultimately failed while being installed. ActivationFailed 386 indicates that the agent has attempted to activate the firmware image instance, e but failed while being activated.

The parameter Device. DeviceInfo.VendorConfigFile.{i}. Version 340 has a description 390 of specifying a string that identifies the configuration file version currently used in the CPE. In response to the CPE being able to obtain the version of the configuration file from the file itself, then the value of this Parameter MUST be set to the obtained value. Otherwise, the value of this parameter MUST be an empty string.

The parameter Device.DeviceInfo. VendorConfigFile.{i}.Date 342 has a description 392 of a date and time when the content of the current version of this vendor configuration file was first applied by the CPE.

FIG. 4 is a block diagram of an example architecture for a serverless computing environment 400 to implement the ACS 120, in accordance with some embodiments.

The term "packet" is used herein to generally refer to data packets and data frames. A frame is similar to a packet, except a frame typically includes both a header and a trailer, whereas a packet does not include a trailer.

The serverless computing environment 400 includes a control plane 450 (also referred to as a "serverless computing platform") in communication with multiple execution environments 460-1 to 460-N. The execution environments 460-1 to 460-N are any combination of VMs, lightweight containers, containers running in VMs, or any other suitable virtual computing instance or physical system in which functions can run. The serverless computing environment 400 supports packaging of applications as stateless functions that are housed in small short-lived compute units (e.g., containers) and dynamically scale functions based on user-provided events. For example, a user may upload a function to control plane 450 which may then store the function in a data store 470 and further register with the control plane 450 events such as receipt of a http request that triggers the function to execute. In turn, control plane 450 listens for the registered events and, when a trigger such as an http request is received. The control plane 450 then launches an appropriate serverless computing instance in one of execution environments 160. The serverless computing instance may be launched in a container that is already running or, if no compatible container is running, a container may also be launched that runs the serverless computing instance. Although described herein with respect to launching serverless computing instance(s), in some embodiments the serverless computing environment 400 re-uses serverless computing instance(s) rather than launching new serverless computing instance(s) if the needed serverless computing instance(s) are already running. That is, "launching" as used herein may refer to the launch of a new serverless computing instance or re-use of an already running serverless computing instance(s), as appropriate.

At 403, the control plane 450 of serverless computing environment 400 launches (or re-uses) serverless computing instance(s). The serverless computing instance(s) executes the requested network function(s), such as network function 480 in execution environment(s) 460-2. Launched (or re-used existing) serverless computing instance(s) process packets and return responses to the control plane 450 at 404. The particular processing that is performed and response returned will generally depend on the network function(s) that are executed. In some embodiments, the ACS 120 is implemented in the network function 480 and the FOTA status logs are stored in the FOTA status store 475 within the data store 470.

An example of a comma separated values (CSV) encoded FOTA status log stored by the FOTA status store 475 is as follows:

Datetime, IMEI, ProductClass, SerialNumber, OUI, Software Version, VendorCon figFile. Version,
2022-07-07T11:30:06.918Z, 123456789012345, MODEL-NAME,RMODELJP0012,FFFFFF,4.0.0, 1.0.0, 2022-07-07T12:30:06.918Z, 123456789012345, MODEL-NAME,RMODELJP0012,FFFFFF,4.0.0, 1.0.0, FirmwareImage. Version, FirmwareImage.Status,FaultCode, 2 4.1.0, InstallationFailed,9806

3 4.0.0,Available,0.

This example of a status log identifies a particular CPE 112 with an IMEI-"123456789012345", and that this particular CPE 112 failed a FOTA update from 4.0.0 to 4.1.0, indicating that the particular CPE 112 is still running on firmware 4.0.0.

Figure 5A:
FIGS. 5A, 5B, 5C are sequence diagrams for a method of performing firmware update initiation, device information exchange, firmware download, and firmware installation and logging a FOTA status for each of the firmware update initiation, device information exchange, firmware download, and firmware installation, in accordance with some embodiments.
Figure 5A:
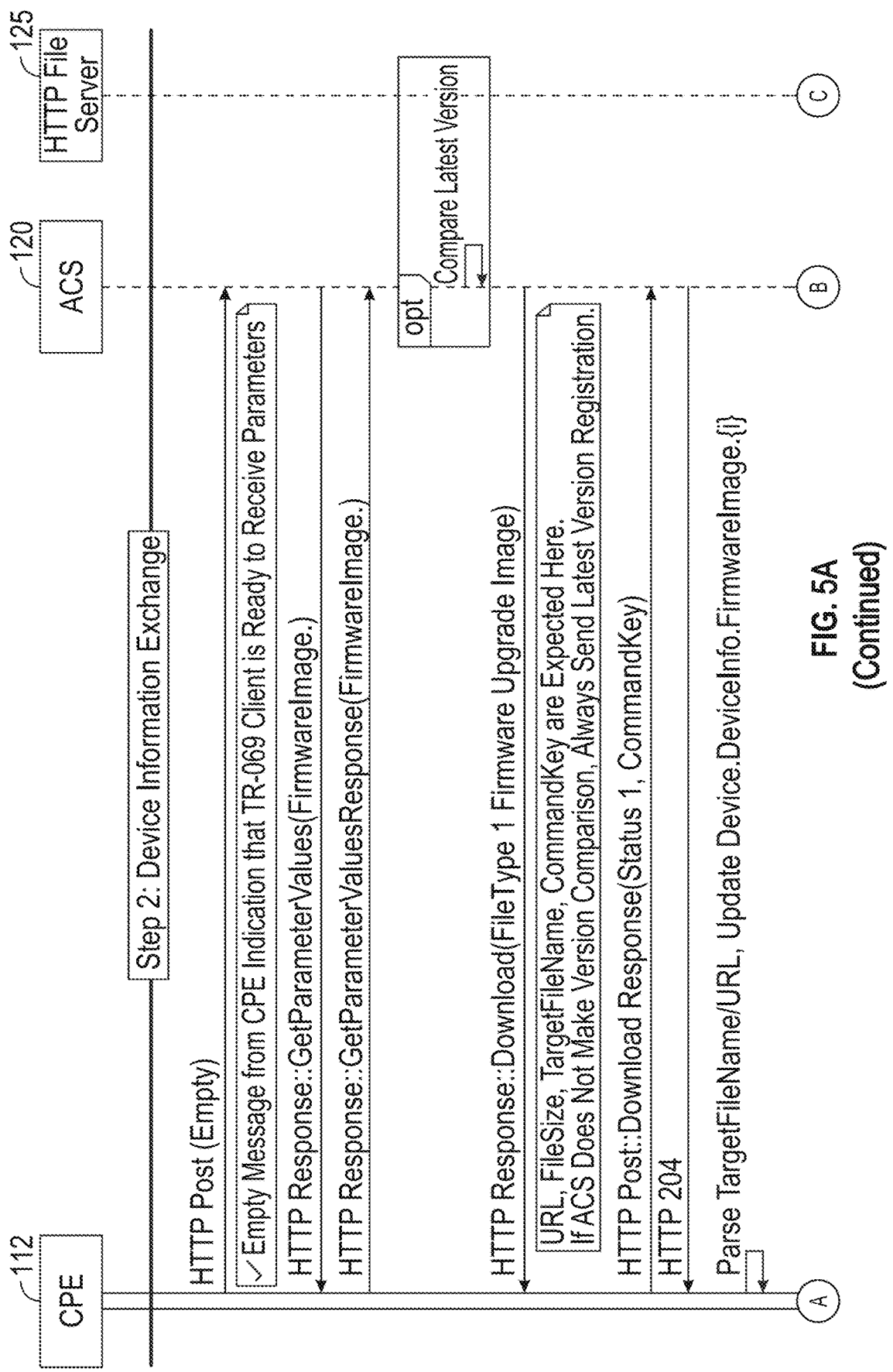
Figure 5A:
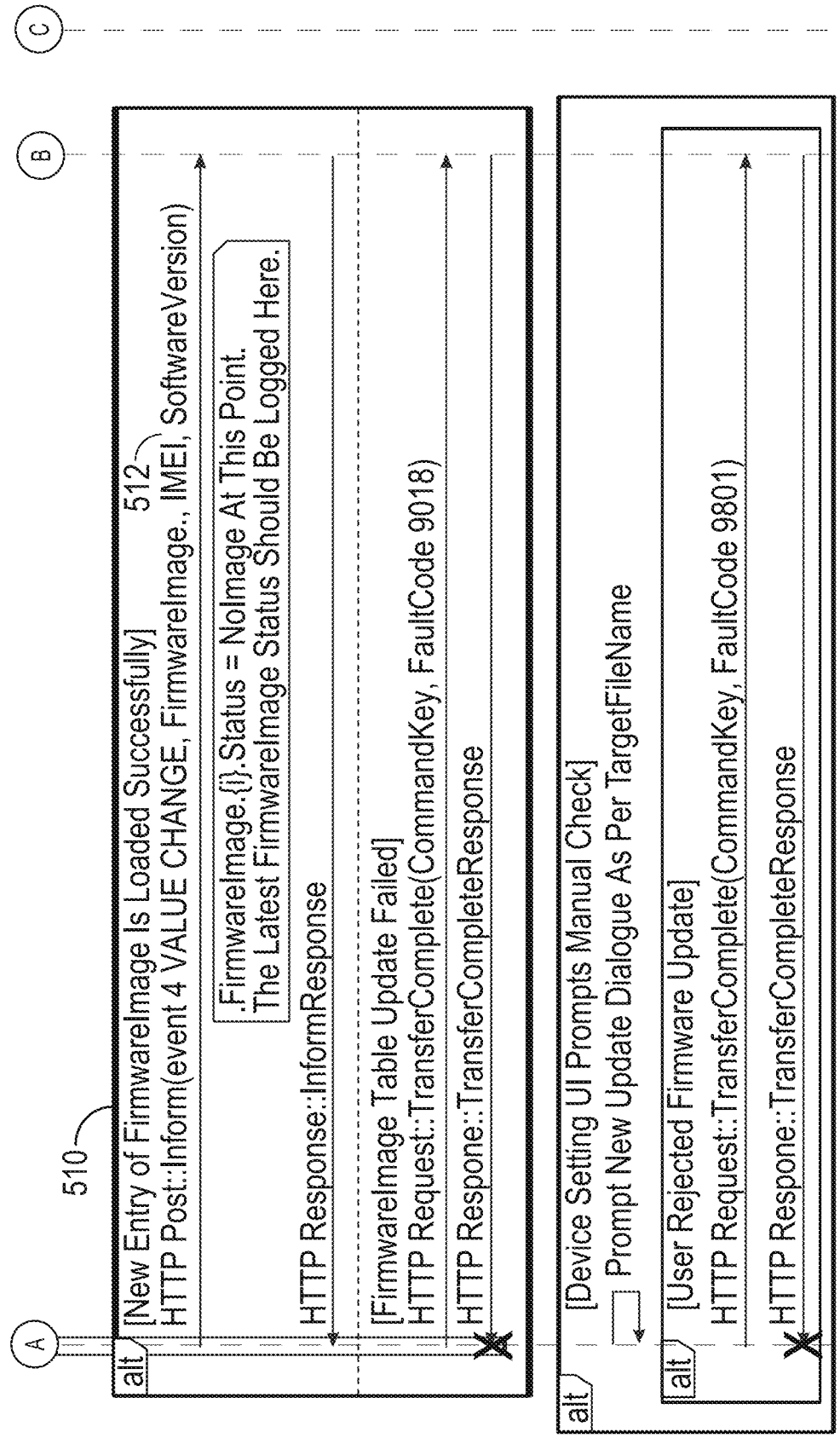
Figure 5B:
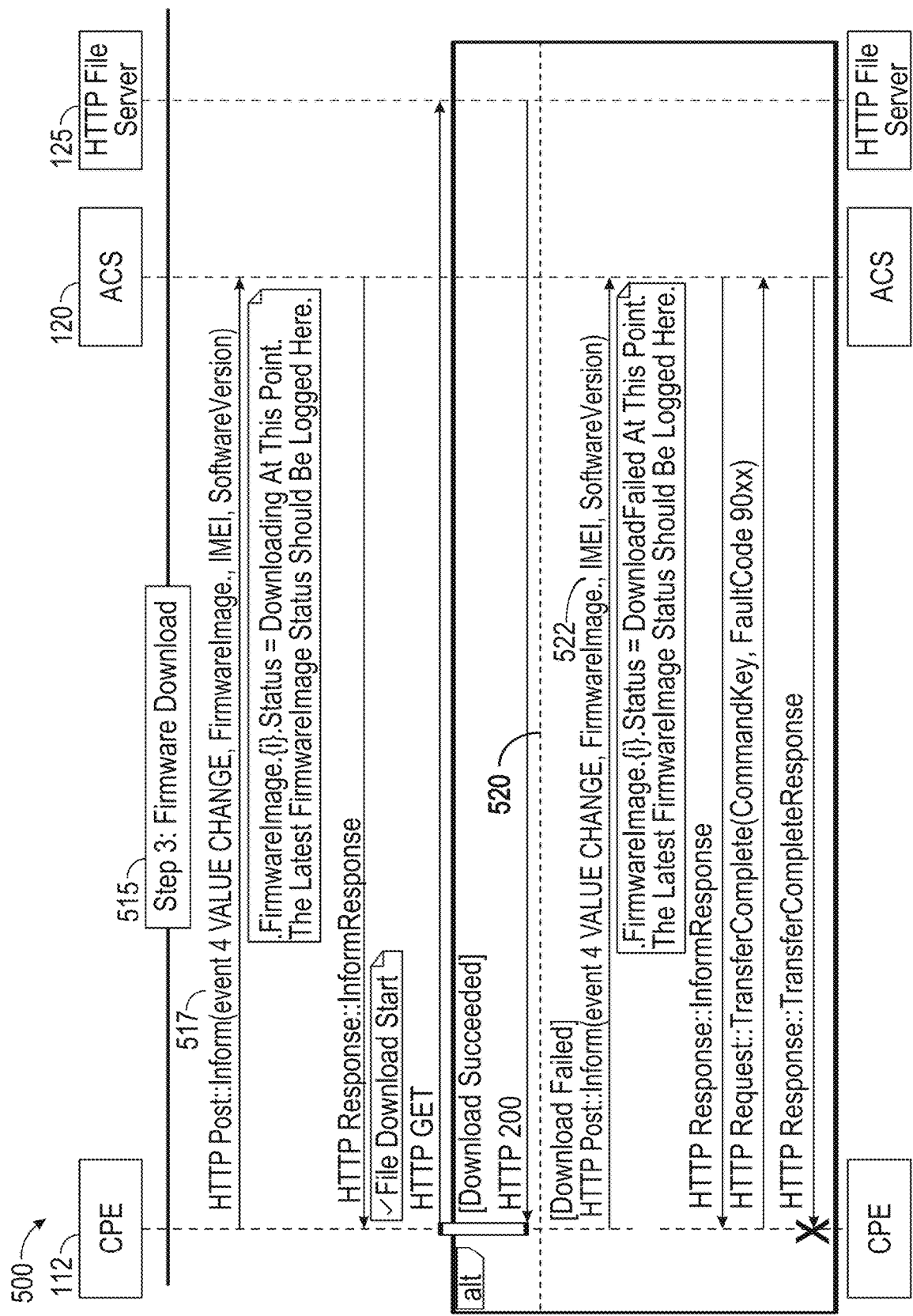
Figure 5B:
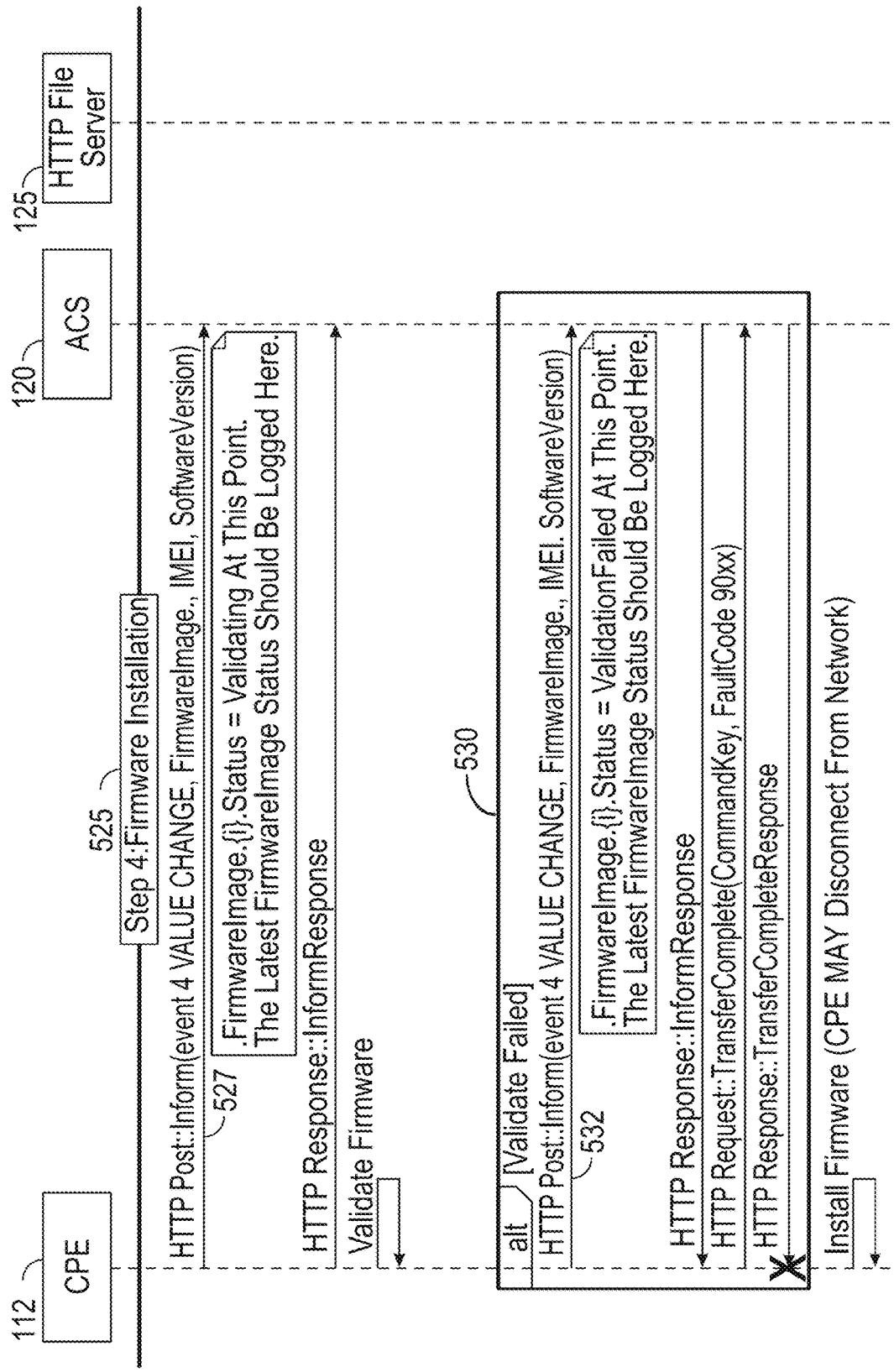
Figure 5C:
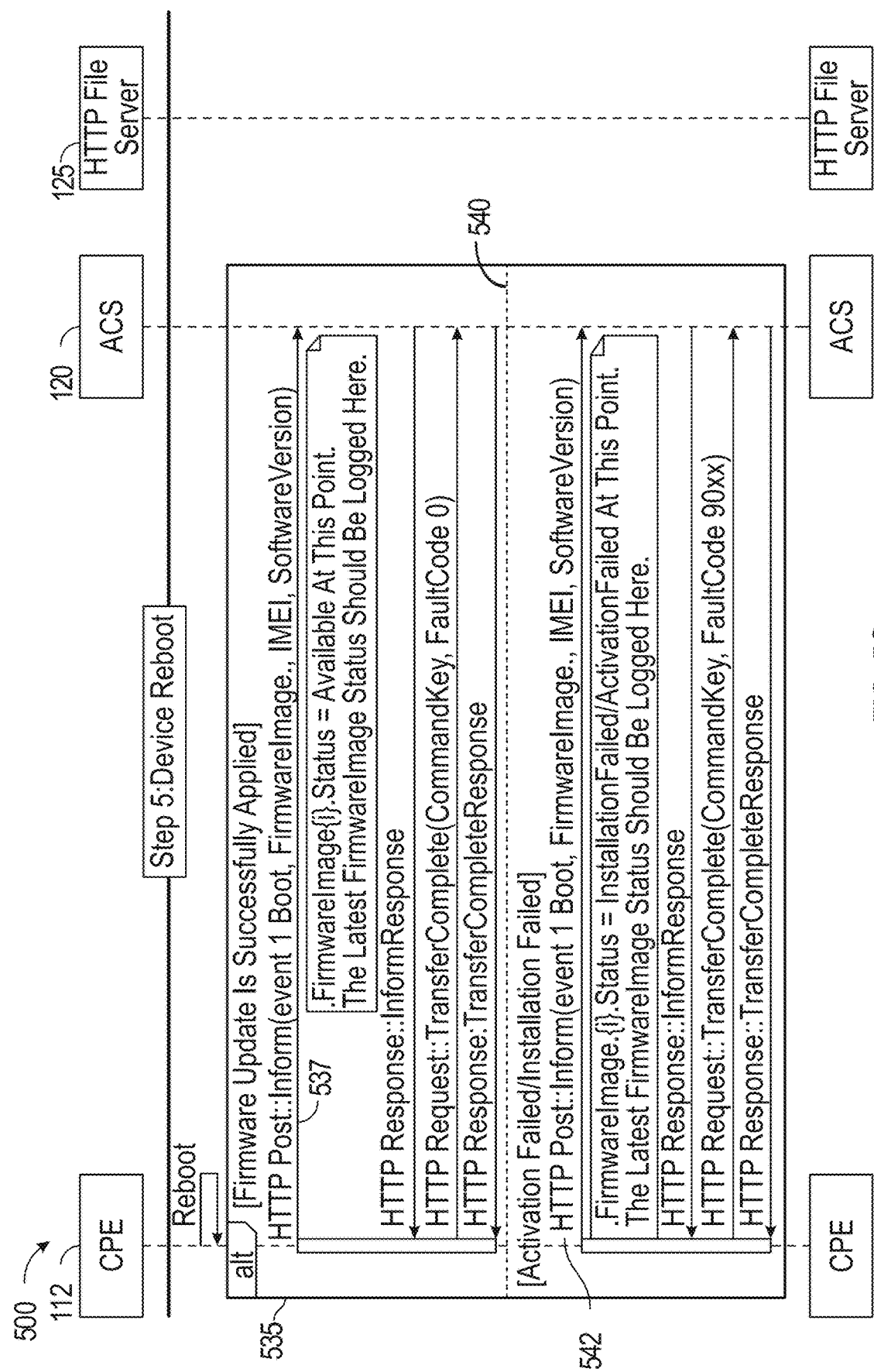

FIGS. 5A, 5B, 5C are sequence diagrams for a method 500 of performing firmware update initiation, device information exchange, firmware download, and firmware installation, in accordance with some embodiments. Although various messages are shown as being communicated between the CPE 112, the ACS 120, and the HTTP file server 125 to perform FOTA update for the CPE 112, this disclosure is limited to a discussion of logging FOTA status for the CPE 112 with the method 500, in accordance with some embodiments.

Within an alternative process 510 shown in FIG. 5A, a new entry of a FirmwareImage is loaded successfully. The CPE 112 sends an HTTP post request including a TR-069 Inform 512 with the 4 VALUE CHANGE event, and parameters of FirmwareImage., IMEI, and SoftwareVersion to the ACS 120. The ACS 120 then stores a FOTA status of .FirwareImage.(i).Status=NoImage in response to the HTTP post request including a TR-069 Inform 512 being sent to the ACS 120, such as logged in the FOTA status store 475.

With process 515 shown in FIG. 5B, a firmware is download. The CPE 112 sends an HTTP post request including a TR-069 Inform 517 with the 4 VALUE CHANGE event, and parameters of FirmwareImage., IMEI, Software Version to the ACS 120. The ACS 120 then stores a FOTA status of .FirwareImage.(i).Status=Downloading in response to the HTTP post request including a TR-069 Inform 517 being sent to the ACS 120, such as logged in the FOTA status store 475.

With an alternative process 520 shown in FIG. 5B, a download failed. The CPE 112 sends an HTTP post request including a TR-069 Inform 522 with the 4 VALUE CHANGE event and parameters of FirmwareImage., IMEI, and SoftwareVersion to the ACS 120. The ACS 120 then stores a FOTA status of .FirwareImage.(i).Status=Downloading in response to the HTTP post request including a TR-069 Inform 522 being sent to the ACS 120, such as logged in the FOTA status store 475.

With process 525 shown in FIG. 5B, a firmware installation occurs. The CPE 112 sends an HTTP post request including a TR-069 Inform 527 with the 4 VALUE CHANGE event and parameters of FirmwareImage., IMEI, and Software Version to the ACS 120. The ACS 120 then stores a FOTA status of .FirwareImage.(i).Status=Validating in response to the HTTP post request including a TR-069 Inform 527 being sent to the ACS 120, such as logged in the FOTA status store 475.

With an alternative process 530 shown in FIG. 5B, a validate failed. The CPE 112 sends an HTTP post request including a TR-069 Inform 332 with the 4 VALUE CHANGE event and parameters of FirmwareImage., IMEI, and SoftwareVersion to the ACS 120. The ACS 120 then stores a FOTA status of .FirwareImage.(i).Status=ValidationFailed in response to the HTTP post request including a TR-069 Inform 332 being sent to the ACS 120, such as logged in the FOTA status store 475.

With an alternative process 535 shown in FIG. 5C, a firmware update is successfully applied. The CPE 112 sends an HTTP post request including a TR-069 Inform 537 with the TR-069 event 1 BOOT, and parameters of FirmwareImage., IMEI, and Software Version to the ACS 120. The ACS 120 then stores a FOTA status of .FirwareImage.(i).Status=Available in response to the HTTP post request including a TR-069 Inform 537 being sent to the ACS 120, such as logged in the FOTA status store 475.

With process 540 shown in FIG. 5C, an activation failed/installation failed. The CPE 112 sends an HTTP post request including a TR-069 Inform 542 with the TR-069 event 1 BOOT, and parameters of FirmwareImage., IMEI, and SoftwareVersion to the ACS 120. The ACS 120 then stores a FOTA status of .FirwareImage.(i).Status=InstallationFailed/ActivationFailed in response to the HTTP post request including a TR-069 Inform 542 being sent to the ACS 120, such as logged in the FOTA status store 475.

Figure 6:
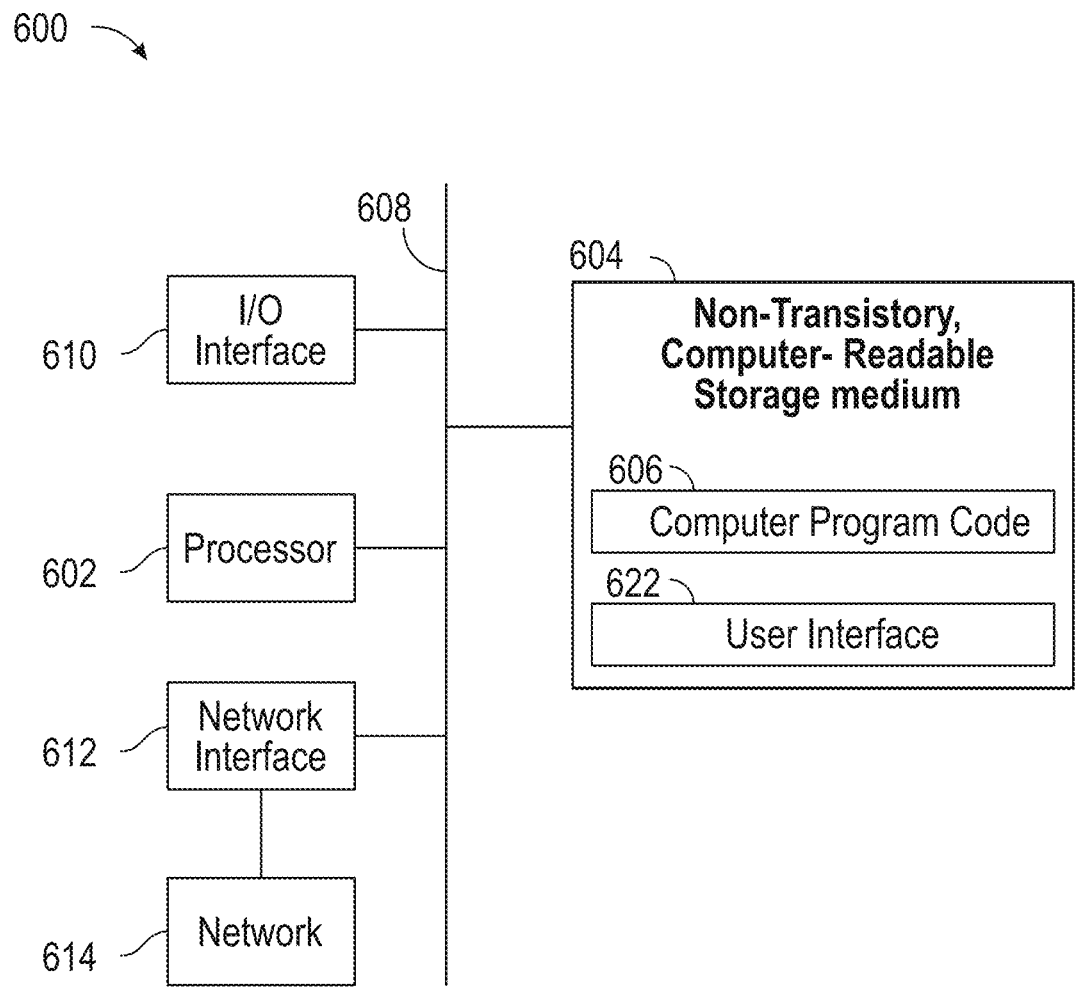
FIG. 6 is a block diagram of processing circuitry to implement any of the features of the FOTA logging system shown in FIG. 1, in accordance with some embodiments.

FIG. 6 is a block diagram of processing circuitry 600 to implement any of the features of the FOTA status logging system 100, such as the ACS 120, the CPEs 112, the HTTP file server 125, etc., in accordance with some embodiments. In some embodiments, Processing circuitry 600 is a general-purpose computing device including a hardware processor 602 and a non-transitory, computer-readable storage medium 604. Storage medium 604, amongst other things, is encoded with, i.e., stores, computer program code 606, i.e., a set of executable instructions such as an algorithm, and any of the other processes described above performed by the ACS 120 and the CPEs 112. Execution of instructions or computer program code 606 by hardware processor 602 represents (at least in part) FOTA updates for the CPEs 112 and logging a status of such FOTA updates for the CPEs 112 which implements a portion, or all the methods described herein in accordance with one or more embodiments (hereinafter, the noted processes and/or methods).

Processor 602 is electrically coupled to a computer-readable storage medium 604 via a bus 608. Processor 602 is further electrically coupled to an I/O interface 610 by bus 608. A network interface 612 is further electrically connected to processor 602 via bus 608. Network interface 612 is connected to a network 614, so that processor 602 and computer-readable storage medium 604 connect to external elements via network 614. Processor 602 is configured to execute computer program code 606 encoded in computer-readable storage medium 604 to cause processing circuitry 600 to be usable for performing a portion or all the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause processing circuitry 600 to be usable for performing a portion or all the noted processes and/or methods. In one or more embodiments, storage medium 604 further stores information, such as an algorithm which facilitates performing a portion or all the noted processes and/or methods.

Processing circuitry 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Processing circuitry 600 further includes network interface 612 coupled to processor 602. Network interface 612 allows Processing circuitry 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more Processing circuitry 600.

Processing circuitry 600 is configured to receive information through I/O interface 610. The information received through I/O interface 610 includes one or more of instructions, data, design rules, and/or other parameters for processing by processor 602. The information is transferred to processor 602 via bus 608. Processing circuitry 600 is configured to receive information related to the UI 622 through I/O interface 610. The information is stored in computer-readable storage medium 604 as UI 622.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In one or more embodiments, Storage Medium 604 stores instructions configured to cause processor 602 to perform at least a portion of the processes and/or methods for providing a FOTA update for the CPEs 112 and log a status for the FOTA update for the CPEs 112. In one or more embodiments, Storage Medium 604 also stores information, such as algorithm which facilitates performing at least a portion of the processes and/or methods for providing a FOTA update to the CPEs 112, and diagnosing failures related to the FOTA updates for the CPEs 112. Accordingly, in some embodiments, the processor 602 performs a method for providing a FOTA update to the CPEs 112. The process providing a FOTA update to the CPEs 112 includes provisioning an interoperable FOTA interface configured to use TR-069 protocol, establishing, at a server using the interoperable FOTA interface, a firmware update session with a CPE 112, receiving, at the server, data model parameters of the client device using the TR-069 protocol, and provisioning, by the server using the TR-069 protocol, a firmware image to the client device based on the data model parameters.

The process for providing a firmware over-the-air (FOTA) update to client devices provides the advantage of simplifying FOTA server development. Because no external parameters are added nor specified, standard TR-069 server components are reused. The FOTA feature on devices from different vendors is able to be cross-tested/used/deployed with different FOTA services that use the same TR-069 standard.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method comprising:
    receiving, by a configuration server via a TR-069 protocol, a request from a customer premises equipment to update a firmware of the customer premises equipment, the TR-069 protocol including an application layer to log a status of an update of the firmware for the customer premises equipment;
    creating, by the configuration server, a log file for the customer premises equipment in response to the request from the customer premises equipment to update the firmware of the customer premises equipment; and
    logging, by the configuration server via the TR-069 protocol, within the log file the status of the update of the firmware for the customer premises equipment.

2. The method according to claim 1, further comprising further logging, by the configuration server via the TR-069 protocol, within the log file one of a version of a device manufacturer supplied firmware for the update to the firmware or a version of a carrier operator supplied firmware for the update to the firmware.

3. The method according to claim 1, further comprising at least one of:
    logging, by the configuration server via the TR-069 protocol, the status as a no image status in response to a new entry of a firmware image status being received by the ACS from the customer premises equipment;
    logging, by the configuration server via the TR-069 protocol, the status as a downloading status in response to the customer premises equipment downloading the firmware;
    logging, by the configuration server via the TR-069 protocol, the status as a validating status in response to the customer premises equipment validating installation of the firmware;
    logging, by the configuration server via the TR-069 protocol, the status as a validation failed status in response to the customer premises equipment failing to validate the firmware;
    logging, by the configuration server via the TR-069 protocol, the status as a firmware available status in response to the customer premises equipment successfully applying the firmware; or logging, by the configuration server via the TR-069 protocol, the status as a firmware installation/activation failed status in response to the customer premises equipment unsuccessfully installing/activating the firmware.

4. The method according to claim 1, wherein the request from the customer premises equipment to update the firmware is a user interface-initiated request.

5. The method according to claim 1, wherein the configuration server is an auto configuration server (ACS).

6. The method according to claim 1, further comprising providing, by the configuration server, at least a portion of the log file to a third-party device.

7. The method according to claim 1, wherein the customer premises equipment is one of a plurality of customer premises equipment, the method further comprising:
   formulating, by the configuration server, at least one metric associated with the plurality of customer premises equipment requesting to update the firmware associated with the plurality of customer premises equipment; and
   diagnosing at least one failure associated with the update of the firmware of the plurality of customer premises equipment.

8. An apparatus, comprising:
   a processor; and
   a memory having instructions stored thereon that, when executed by the processor, cause the processor to:
   receive, by a configuration server via a TR-069 protocol, a request from a customer premises equipment to update a firmware of the customer premises equipment, the TR-069 protocol including an application layer to log a status of an update of the firmware for the customer premises equipment;
   create, by the configuration server, a log file for the customer premises equipment in response to the request from the customer premises equipment to update the firmware of the customer premises equipment; and
   log, by the configuration server via the TR-069 protocol, within the log file the status of the update of the firmware for the customer premises equipment.

9. The apparatus according to claim 8, wherein the instructions, when executed by the processor, further cause the processor to log, by the configuration server via the TR-069 protocol, within the log file one of a version of a device manufacturer supplied firmware for the update to the firmware or a version of a carrier operator supplied firmware for the update to the firmware.

10. The apparatus according to claim 8, wherein the instructions, when executed by the processor, further cause the processor to at least one of:
   log, by the configuration server via the TR-069 protocol, the status as a no image status in response to a new entry of a firmware image status being received by the ACS from the customer premises equipment;
   log, by the configuration server via the TR-069 protocol, the status as a downloading status in response to the customer premises equipment downloading the firmware;
   log, by the configuration server via the modified TR-069 protocol, the status as a validating status in response to the customer premises equipment validating installation of the firmware;
   log, by the configuration server via the TR-069 protocol, the status as a validation failed status in response to the customer premises equipment failing to validate the firmware;
   log, by the configuration server via the TR-069 protocol, the status as a firmware available status in response to the customer premises equipment successfully applying the firmware; or
   log, by the configuration server via the TR-069 protocol, the status as a firmware installation/activation failed status in response to the customer premises equipment unsuccessfully installing/activating the firmware.

11. The apparatus according to claim 8, wherein the request from the customer premises equipment to update the firmware is a user interface-initiated request.

12. The apparatus according to claim 8, wherein the configuration server is an auto configuration server (ACS).

13. The apparatus according to claim 8, wherein the instructions, when executed by the processor, further cause the processor to provide, by the configuration server, at least a portion of the log file to a third-party device.

14. The apparatus according to claim 8, wherein the instructions, when executed by the processor, further cause the processor to:
   formulate, by the configuration server, at least one metric associated with the plurality of customer premises equipment requesting to update the firmware associated with the plurality of customer premises equipment; and
   diagnose at least one failure associated with the update of the firmware of the plurality of customer premises equipment.

15. A non-transitory computer readable medium having instructions stored thereon that, when executed by a processor, cause the processor to:
   receive, by a configuration server via a TR-069 protocol, a request from a customer premises equipment to update a firmware of the customer premises equipment, the TR-069 protocol including an application layer to log a status of an update of the firmware for the customer premises equipment;
   create, by the configuration server, a log file for the customer premises equipment in response to the request from the customer premises equipment to update the firmware of the customer premises equipment; and
   log, by the configuration server via the TR-069 protocol, within the log file the status of the update of the firmware for the customer premises equipment.

16. The non-transitory computer readable medium according to claim 15, wherein the instructions further cause the processor to log, by the configuration server via the TR-069 protocol, within the log file one of a version of a device manufacturer supplied firmware for the update to the firmware or a version of a carrier operator supplied firmware for the update to the firmware.

17. The non-transitory computer readable medium according to claim 15, wherein the instructions further cause the processor to at least one of:
   log, by the configuration server via the TR-069 protocol, the status as a no image status in response to a new entry of a firmware image status being received by the ACS from the customer premises equipment;
   log, by the configuration server via the TR-069 protocol, the status as a downloading status in response to the customer premises equipment downloading the firmware;
   log, by the configuration server via the TR-069 protocol, the status as a validating status in response to the customer premises equipment validating installation of the firmware;

log, by the configuration server via the TR-069 protocol, the status as a validation failed status in response to the customer premises equipment failing to validate the firmware;

log, by the configuration server via the TR-069 protocol, the status as a firmware available status in response to the customer premises equipment successfully applying the firmware; or log, by the configuration server via the TR-069 protocol, the status as a firmware installation/activation failed status in response to the customer premises equipment unsuccessfully installing/activating the firmware.

18. The non-transitory computer readable medium according to claim 15, wherein the configuration server is an auto configuration server (ACS).

19. The non-transitory computer readable medium according to claim 15, wherein the instructions further cause the processor to provide, by the configuration server, at least a portion of the log file to a third-party device.

20. The non-transitory computer readable medium according to claim 15, wherein the instructions further cause the processor to:

formulate, by the configuration server, at least one metric associated with the plurality of customer premises equipment requesting to update the firmware associated with the plurality of customer premises equipment; and diagnose at least one failure associated with the update of the firmware of the plurality of customer premises equipment.

\* \* \* \* \*